2 Sheets--Sheet 1

P. MUNZINGER.

Gas-Purifiers.

No. 6,157. Reissued Dec. 1, 1874.

Witnesses;

Thomas J. Dewey.

Stephen Ustick

Inventor;

Peter Munzinger

P. MUNZINGER.

Gas-Purifiers

No. 6,157.

Reissued Dec. 1, 1874.

Witnesses;

Thomas J. Barly

Stephen Stirick

Inventor;

Peter Munzinger

UNITED STATES PATENT OFFICE.

PETER MUNZINGER, OF PHILADELPHIA, PENNSYLVANIA, ASSIGNOR TO MORRIS, TASKER & CO., OF SAME PLACE.

IMPROVEMENT IN GAS-PURIFIERS.

Specification forming part of Letters Patent No. 88,326, dated March 30, 1869; reissue No. 4,707, dated January 9, 1872; reissue No. 6,157, dated December 1, 1874; application filed November 10, 1874.

*To all whom it may concern:*

Be it known that I, PETER MUNZINGER, of the city and county of Philadelphia, in the State of Pennsylvania, have invented an Improvement in Gas-Purifiers, of which the following is a specification:

The object of my invention is the construction of the sections of the purifiers in such a manner as will obviate the difficulty heretofore experienced in bolting the inner flanges together, and at the same time make it practicable to construct the water cup or seal much narrower than when made in the usual manner. To accomplish this end, instead of making the inner vertical flanges of the sections within the water-cup, I have them to project into the gas-chamber, whereby the bolts which fasten them are conveniently and expeditiously put in their places, and their nuts are easily secured, and in much less time than when the flanges are within the water-cup; and this arrangement makes it practicable to construct the water-cup of merely sufficient width for the sealing of the cover, whereas in the old method considerable space is required for screwing up the nuts of the confining-bolts, thus requiring great width of the water-cup, and, consequently, a correspondingly-increased area of the purifier over that required when constructed on my plan.

Figure 1:
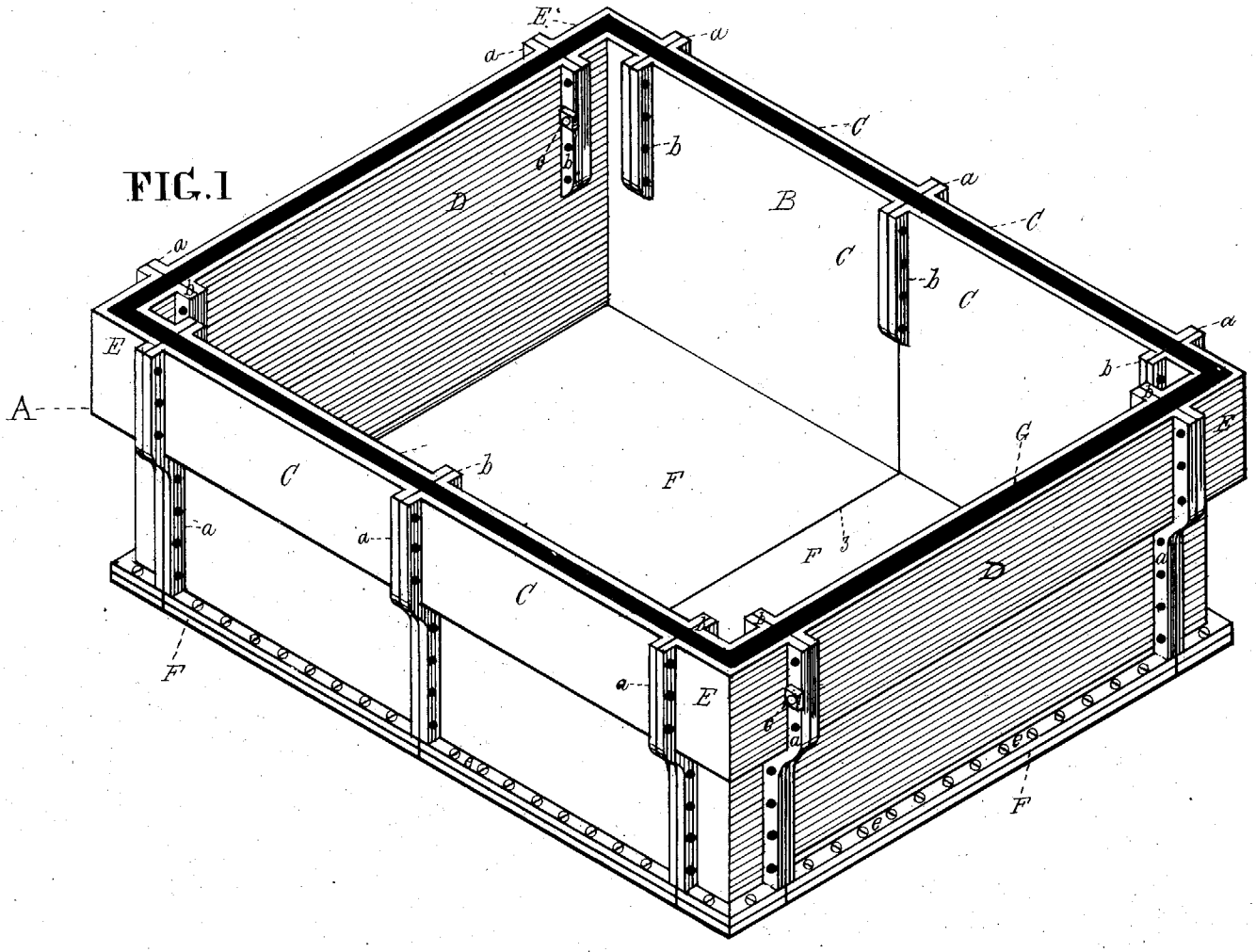
Figure 2:
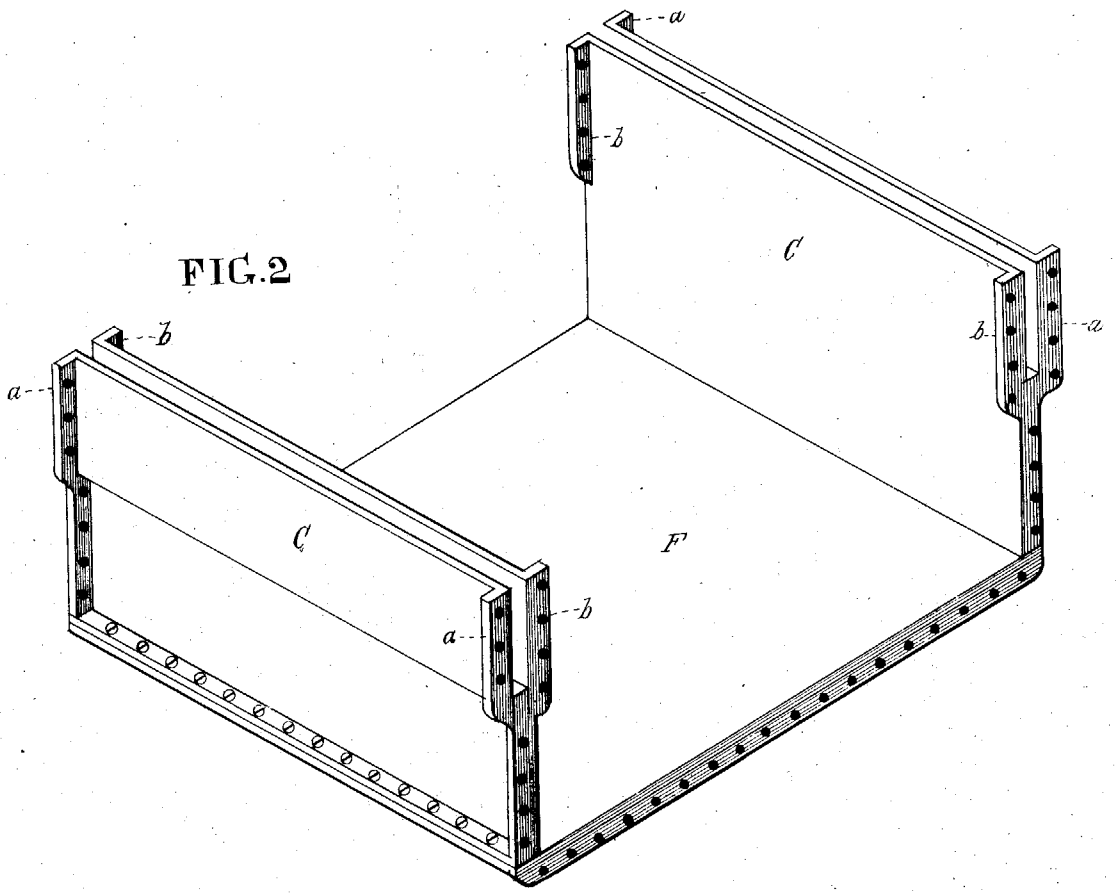

In the accompanying drawings, Figure 1 is an isometrical view of my improved gas-purifier. Fig. 2 is a like view of a middle combined section, consisting of side plates C C and a bottom plate, F.

Like letters of reference in both figures indicate the same parts.

A represents my improved purifier. As there is nothing new in the cover, the inlet and outlet passages, and the lime-trays, these parts are not shown in the drawings. B is the gas-chamber. I put the purifier together in sections, in which C C are the side sections; D D, the end sections; E E E E, corner sections, and F F the bottom sections. All the vertical sections have grooves, which, when the sections are combined together, as seen in Fig. 1, form the continuous water cup or seal G. The vertical sections are provided with outer flanges *a*, and with inner flanges *b*, which receive bolts *c* for securing them together. The inner flanges *b* project into the gas-chamber B, for the purpose of giving abundant room for connecting the bolts and securing the nuts, thus avoiding the difficulty experienced in the ordinary mode when these flanges project into the water-cup G. The bottom sections F F have flanges *e e*, for confining the inner edges together. Their outer edges are confined, by means of bolts, to the bottom flanges *f* of the vertical sections.

The purifier may be enlarged by inserting one or more sections at each side between the side sections, or at each end between the end sections, and corresponding bottom section or sections. In Fig. 2 a middle combined section, composed of side sections C C and a bottom section, F, is shown. By removing the bolts at the middle joint Z of the purifier, and inserting the combined section between the two end sections, and confining the parts together by means of the bolts previously withdrawn, the purifier will be enlarged in the direction of its length. If it is desired to increase the width of the purifier, the object may be accomplished in the same manner.

I do not claim constructing the purifier in sections, as that has been done before; nor do I claim forming the water cup or seal in continuous connection with the sections which have flanges for bolting them together, as that is not new; but

What I claim as my invention is—

A gas-purifier having a chamber, B, and water-cup G, the sections of which have flanges *a e* on their outside for bolting them together, and additional flanges *b* on the inner sides of the water-cup, projecting into the chamber B, substantially in the manner and for the purpose above described.

PETER MUNZINGER.

Witnesses:

STEPHEN USTICK,

THOMAS J. BEWLEY.